(12) United States Patent
Williams

(10) Patent No.: US 7,788,050 B2
(45) Date of Patent: Aug. 31, 2010

(54) SYSTEM AND METHOD TO LOCATE COMMON PATH DISTORTION ON CABLE SYSTEMS

(75) Inventor: Thomas Holtzman Williams, Beaverton, OR (US)

(73) Assignee: Arcom Digital, LLC, Syracuse, NY (US)

( * ) Notice: Subject to any disclaimer, the term of this patent is extended or adjusted under 35 U.S.C. 154(b) by 0 days.

(21) Appl. No.: 12/217,547

(22) Filed: Jul. 7, 2008

(65) Prior Publication Data

US 2008/0319689 A1    Dec. 25, 2008

Related U.S. Application Data

(63) Continuation of application No. 10/850,528, filed on May 20, 2004, now Pat. No. 7,415,367.

(60) Provisional application No. 60/472,379, filed on May 20, 2003.

(51) Int. Cl.
    *G01R 31/00* (2006.01)
(52) U.S. Cl. ....................................... 702/59
(58) Field of Classification Search ............ 702/57–60, 702/64, 65, 69, 79, 82, 182, 183, 185, 190; 455/189.1, 209, 293, 326, 456.1
    See application file for complete search history.

(56) References Cited

U.S. PATENT DOCUMENTS

| | | | |
|---|---|---|---|
| 3,774,201 A | 11/1973 | Collins | |
| 5,073,822 A | 12/1991 | Gumm et al. | |
| 5,461,318 A | 10/1995 | Borchert et al. | |
| 5,617,137 A | 4/1997 | Whitlow | |
| 5,682,100 A | 10/1997 | Rossi | |
| 5,990,687 A | 11/1999 | Williams | |
| 6,140,822 A | 10/2000 | Williams | |
| 6,151,559 A | 11/2000 | Williams | |
| 6,344,749 B1 | 2/2002 | Williams | |
| 6,356,555 B1 | 3/2002 | Rakib et al. | |

(Continued)

FOREIGN PATENT DOCUMENTS

EP    0 487 306 A2    5/1992

(Continued)

OTHER PUBLICATIONS

International Search Report in PCT/US2006/006360, dated Oct. 2, 2006, pp. 2-3 & 5-6.

(Continued)

*Primary Examiner*—Mohamed Charioui
(74) *Attorney, Agent, or Firm*—Lawrence P. Trapani

(57) ABSTRACT

A system and method to range a distance to a source of CPD on a two-way cable system, comprises a fixed CW signal injected into a downstream signal path, a swept signal transmitted from a network analyzer, a mixer for generating an up-converted swept signal, and a source of CPD in the two-way cable system that mixes the fixed CW signal and the swept signal to create an upstream swept signal. The network analyzer receives the upstream swept signal and determines a complex frequency response created by the source of CPD. An impulse response is determined from the complex frequency response, and the distance to the source of CPD is determined from the impulse response.

18 Claims, 8 Drawing Sheets

U.S. PATENT DOCUMENTS

| | | | |
|---|---|---|---|
| 6,417,942 | B1 | 7/2002 | Seto et al. |
| 6,425,132 | B1 | 7/2002 | Chappell |
| 6,570,394 | B1 | 5/2003 | Williams |
| 6,687,632 | B1 | 2/2004 | Rittman |
| 7,028,061 | B2 * | 4/2006 | Mogi et al. ............. 708/319 |
| 7,069,163 | B2 | 6/2006 | Gunther et al. |
| 2001/0004601 | A1 * | 6/2001 | Drane et al. ............. 455/456 |
| 2001/0051504 | A1 | 12/2001 | Kubo et al. |
| 2002/0086641 | A1 | 7/2002 | Howard |
| 2002/0161542 | A1 | 10/2002 | Jones et al. |
| 2003/0142622 | A1 | 7/2003 | Kaku et al. |
| 2004/0039976 | A1 | 2/2004 | Gunther et al. |
| 2004/0073937 | A1 | 4/2004 | Williams |
| 2004/0091055 | A1 | 5/2004 | Williams |
| 2006/0012376 | A1 | 1/2006 | Furse et al. |

FOREIGN PATENT DOCUMENTS

| | | |
|---|---|---|
| EP | 0 487 306 A3 | 5/1992 |
| JP | 60176336 A1 | 9/1985 |
| SU | 1132265 A1 | 12/1984 |
| WO | 97/20196 A1 | 6/1997 |
| WO | 00/57571 A1 | 9/2000 |
| WO | 2004/070398 A2 | 8/2004 |
| WO | 2004/070398 A3 | 9/2004 |

OTHER PUBLICATIONS

Written Opinion w/Claims in PCT/US2006/006360, dated Oct. 2, 2006, pp. 10-21.

Williams, Thomas Holtzman, Cable Scope® Instruction Manual, dated 1988-2003, pp. 1-10, 13-15, 20-22, 24-30, Holtzman Inc., Longmont, Co.

Eastment, Rod, et al., CPD Fault Locator, Article, dated Sep. 4, 2002, pp. 1-10, SCTE, www/scte.org.

Zhang, Yun Hong & Jennings, Len, DSP Applications in Range Finding, Article, dated Jan. 1, 2002, pp. 61-66, New Zeland, http://www.manukau.ac.nz/departments/e_e/research/2002/yz.pdf.

Williams, Thomas Holtzman, Return Path Linear Distortion and Its Effect on Data Transmissions, Symposium, dated Jun. 2000, pp. 54-71, 2000 NCTA Technicl Papers.

Patel, Bharat, Common Path Distortions Explained, Article, dated Oct. 13, 1998, SCTE, http://chapters.scte.org/newengland/reference/CPD/CPD2.HTM.

Williams, Thomas H. et al., Results of Return Plant Testing, Symposium, dated Jun. 1997, pp. 142-165, 1997 NCTA Technical Papers.

Williams, Thomas Holtzman, Proofing and Maintaining Upstream Cable Plant With Digital Signal Analysis Techniques, Article, dated Jun. 13, 1997, pp. 7-18, 49th ARFTG Conference Digest.

Lee, Edward A. & Messerschmitt, David G., Digital Communication, Second Edition, Reference Book, dated Jan. 1, 1994, pp. 231-234, Kluwer Academic Publishers, Norwell, MA.

* cited by examiner

SYSTEM AND METHOD TO LOCATE COMMON PATH DISTORTION ON CABLE SYSTEMS

CROSS-REFERENCE TO RELATED APPLICATIONS

This application is a continuation of U.S. application Ser. No. 10/850,528, filed May 20, 2004, which claims the benefit of U.S. Provisional Application No. 60/472,379, filed May 20, 2003.

BACKGROUND OF THE INVENTION

1. Field of the Invention

The present invention relates generally to electrical measuring and testing apparatus and methods, and more particularly to apparatus and methods of fault location in cable systems.

2. Background Art

Two-way hybrid fiber coax (HFC) cable systems typically provide two-way communications for end users (typically homes or businesses) using both coaxial cable and fiber optic cable. A headend is a collection point for downstream signals and a termination point for upstream signals. "Downstream" or "forward" means signals traveling away from the headend and "upstream" or "reverse" means signals traveling toward the headend.

The coaxial portion of cable networks uses a tree-and-branch architecture to split downstream signals and combine upstream signals. On the coaxial portion of the cable plant, downstream signals are sent from a headend to an end user in a downstream frequency band, which may be 54 to 860 MHz. The composite downstream signal is typically comprised of analog television signals in the lower frequencies, such as 54 to 550 MHz, and digital television signals and cable modem traffic in the upper frequency band, such as 550 to 860 MHz. Upstream signals travel from the end users to the headend in the 5 to 42 MHz upstream frequency band over the same coaxial cable that is used for downstream communications.

The fiber portion of the plant is typically nearer to the headend and transports signals a long distance to a cluster of subscribers. The point at which the downstream fiber optic (light) signals are converted to downstream electrical signals for transmission over coaxial cable is called a fiber node. The upstream electrical signals are also converted into fiber optic signals at the fiber node for transmission back to the headend. In larger plants there may be additional signal distribution/collection points called "hubs". In the United States the downstream is typically divided into 6 MHz channels that usually contain analog NTSC carriers or digital carriers. Normally, upstream channel spacing is not uniform.

Common path distortion (CPD) is an upstream impairment that is created on the coaxial portion of HFC cable systems. CPD is caused by downstream signals mixing together in non-linear elements to create an upstream interference that is comprised of distortion or inter-modulation products. CPD is typically produced by diodes that are formed by metallic corrosion in network elements such as taps, amplifiers, splitters, power inserters, and connectors. Finding the network element where the distortion is created is a difficult problem for cable technicians, because the act of touching or opening a network element frequently corrects the CPD problem, albeit temporarily.

With a large number of analog television channels (such as NTSC) on the downstream path, the upstream spectral plot caused by CPD has an appearance on a spectrum analyzer of three beats every 6 MHz across the return band. In the United States, with a standard frequency plan, second order distortion beats are centered every integer multiple of 6 MHz, and third order distortion beats are located every 1.25 MHz above and below the second order beats. If there are two radio frequency carriers at fa and fb, second order beats can be created by mixing products such as 2*fa, or 2*fb, or fa-fb, or fb-fa. If you have three carriers, such as fa, fb, and fc, third order beats can be created from many mixing products such as 3*fa, 3*fb, 3*fc, fa+fb+bc, 2fa-fb, 2fb-fc, 2fc-fa, etc. The distortion products at the 6 MHz increments are second order distortion products because television channel spacing in the United States is 6 MHz. The third order distortion products at plus and minus 1.25 MHz from the second order beats are offset because video carrier frequencies, such as channel 2 at 55.25 MHz and channel 3 at 61.25 MHz, are not integer multiples of 6 MHz in a standard frequency plan.

While CPD has been observed on the upstream cable plant, mixing from CPD products also fall into the downstream frequency spectrum, where a visual impairment will be created that is similar to CSO (common second order) or CTB (composite triple beat), which are well-known downstream impairments. Thus, customer complaints about excessive downstream CTB may, in fact, be partially downstream CPD distortion products. Thus there is a need to find and fix sources of CPD.

The prior art method of finding CPD is to disconnect upstream network elements one at a time until the CPD goes away. This is a trial and error process, which is slow and prone to error because of the aforementioned problem of temporarily fixing CPD when the defective element is disturbed. Disconnecting network elements also disrupts services.

A new method in use by Optus in Australia ranges a distance to a CPD source using custom-designed special-purpose test equipment. This method is described by Australian patent application TW474071. Their system is comprised of PC-based test equipment, which injects test signals into vacant bandwidth on the downstream plant. On many cable systems vacant bandwidth for testing does not exist.

Interference with cable entertainment signals, voice carriers and data traffic for test is generally unacceptable.

This invention discloses a better method by determining a time delay associated with a defective CPD-creating element by using signals that are already being transported on the cable system. The time delay may be used to compute a round-trip distance using the known velocity of propagation. Knowing a distance to the CPD-creating element allows the defective device to be identified from a network map that shows distances.

This invention also discloses an improved injected test signal method that uses standard off-the-shelf test equipment.

SUMMARY OF THE INVENTION

This invention is a system to range a distance to a source of CPD on a two-way cable system utilizing signals that are normally carried on the downstream signal path. The system is comprised of a local CPD source that generates a local distortion signal from a downstream signal, and a source of CPD that mixes the downstream signal to create an upstream actual distortion signal. A cross-correlator performs a cross-correlation between the local distortion signal and the upstream actual distortion signal to create a cross-correlation plot. A round-trip time to the source of CPD is determined from the cross-correlation plot, and the distance is determined from the round-trip time.

DESCRIPTION OF FIG. 1

Figure 1:
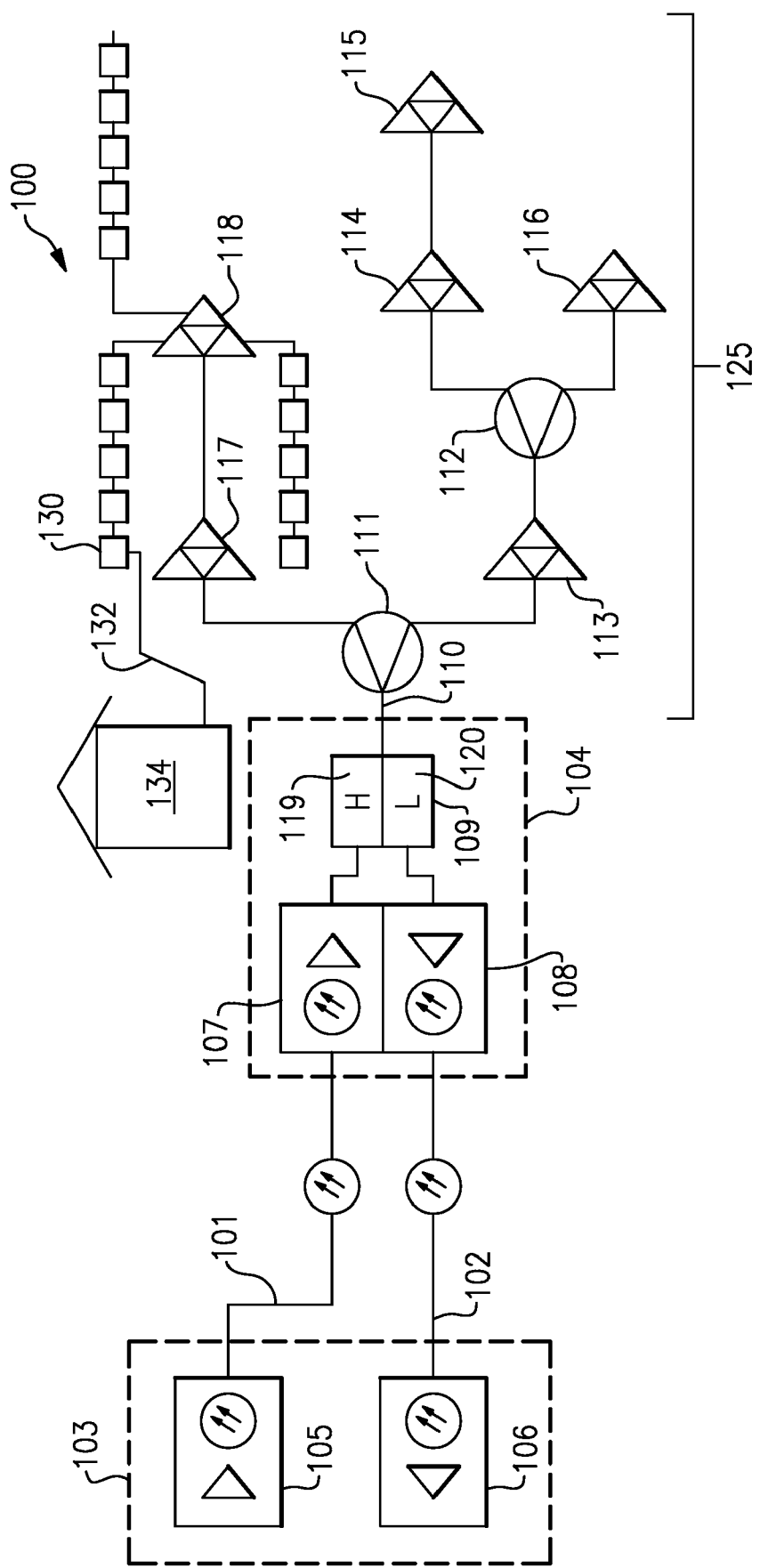
FIG. 1 is a prior art block diagram of a hybrid fiber-coax (HFC) cable plant.

FIG. 1 is a prior-art block diagram that illustrates a bidirectional cable system 100 which employs a single mode fiber optic cable 101 for the long reach from a headend 103 to a fiber node 104. In the headend 103, which is the collection point for downstream signals, are located a downstream laser transmitter 105 and an upstream laser receiver 106. At the fiber node 104, which is typically housed in a weather tight outdoor housing, a downstream signal is converted from an optical signal into an electrical signal by a downstream laser receiver 107 and an upstream electrical signal is converted into an optical signal by an upstream laser transmitter 108. The upstream and downstream electrical signals are applied to a diplex filter 109, which allows bi-directional signal flow on a same hard line coaxial cable 110. Diplex filters consist of a high-pass section 119 and a low-pass section 120. Splitter/combiners 111 and 112 split the downstream signals and combine the upstream signals. Two-way amplifiers 113-118 boost the signal levels in both directions to overcome the loss of the coaxial cables and splitter/combiners. Taps, such as a tap 130, are also splitting/combining devices that allow signal extraction and insertion.

A coaxial cable plant 125 can be defined as the coaxial portion of the bi-directional cable system 100, which extends from the fiber node 104 to the insides of the houses such as a house 134. Typically, the coaxial cable plant 125 is constructed of solid sheath hard-line aluminum coaxial cable from the fiber node 104 to the tap 130, and a braided shield drop cable 132 is used from the tap 130 to a house 134 as well as inside the house 134. All coaxial cable has a single center conductor, which is typically surrounded by a foam dielectric. Hard line coaxial cable has a single shield, and flexible drop coaxial cable normally has multiple shields that are electrically in contact with each other.

DESCRIPTION OF FIG. 2

Figure 2:
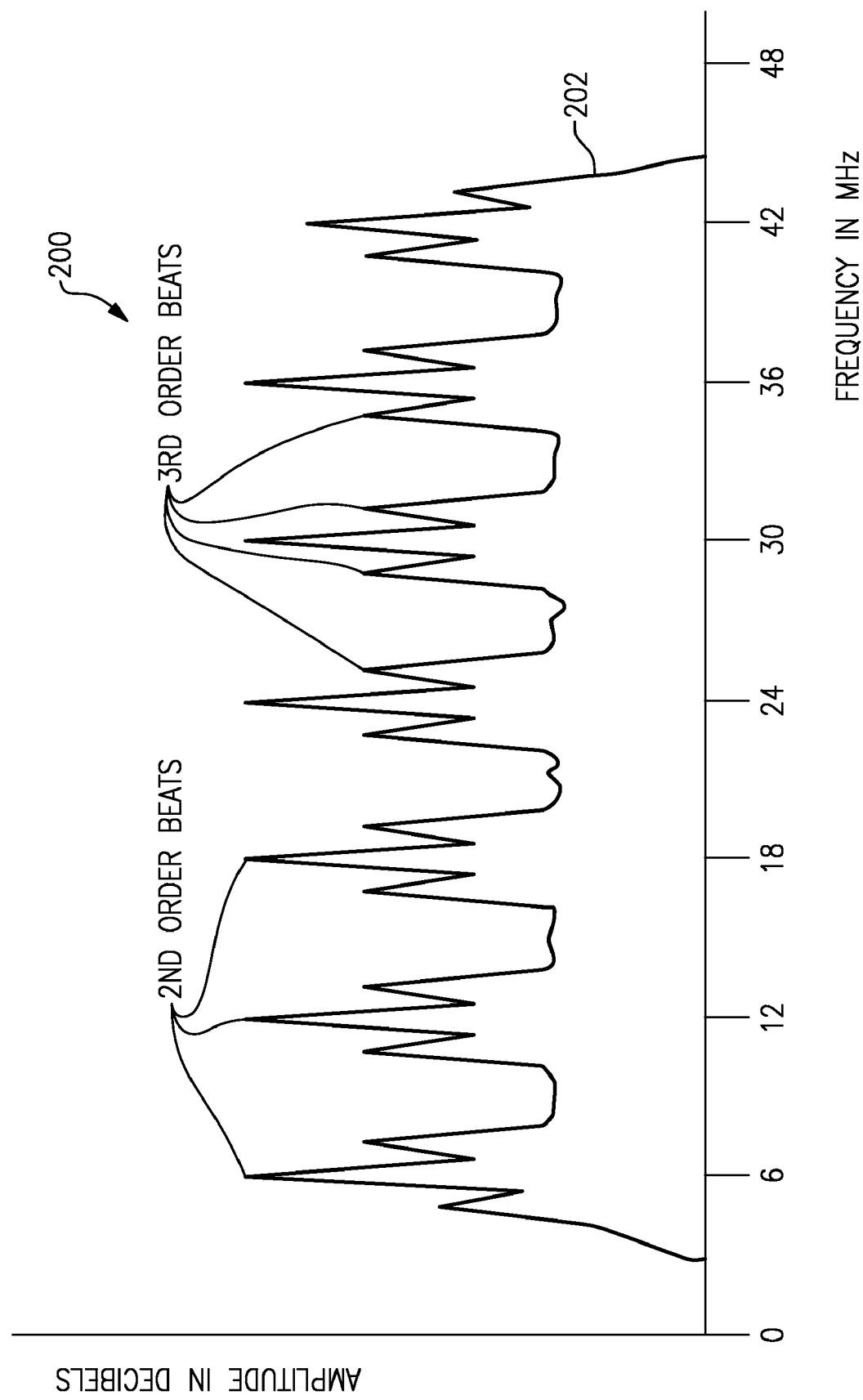
FIG. 2 is a spectral plot of an upstream spectrum with CPD.

FIG. 2 is a spectral plot 200 showing CPD distortion that was created on the cable portion of a HFC plant using a standard frequency plan. The upstream frequency span is 5 to 42 MHz. The plot is an example of an actual distortion signal 202 that is created by one or more elements that are sources of CPD in the cable plant. If the downstream signal contains both digital and analog carriers, the actual distortion signal 202 will contain mixing components of analog channels with other analog channels, digital channels with other digital channels, and analog channels mixing with digital channels. Second order distortion components from analog TV channels are shown every 6 MHz and third order distortion components from analog TV channels occur plus and minus 1.25 MHz from the second order beats. The CPD-produced actual distortion signal 202 will be summed with legitimate signals, undesired random noise products, or undesired ingressing signals. Different frequency spacing or the use of harmonically related carriers will change the appearance of the CPD spectrum. Having a greater percentage of digital carriers relative to analog carriers will also change the spectral appearance of the actual distortion signal 202. As the percentage of downstream digital carriers increases in the future, the actual distortion signal 202 will appear more like random noise and the spectral peaks will be less prominent.

DESCRIPTION OF FIG. 3

Figure 3:
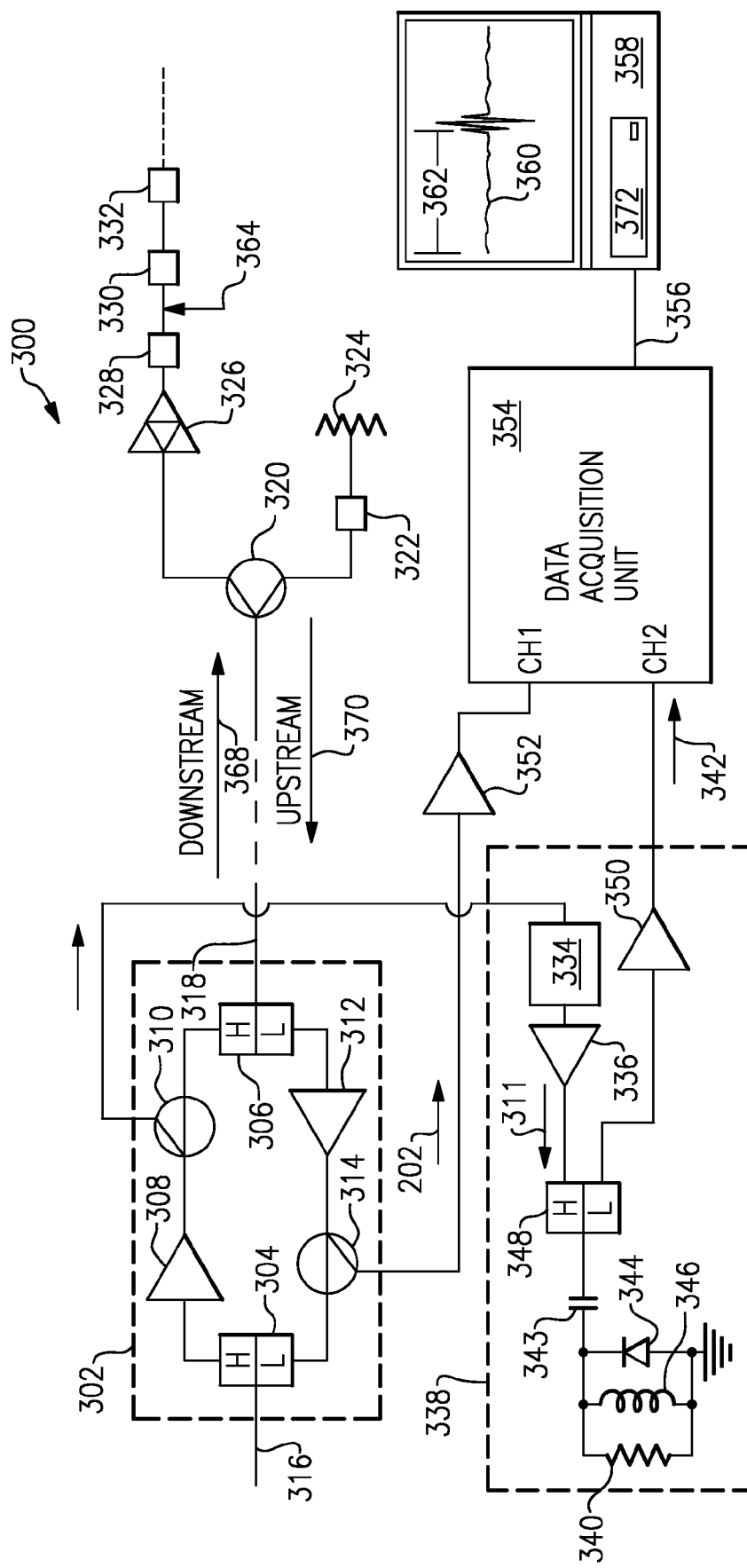
FIG. 3 is a test equipment block diagram of the present invention using existing signals that are already being transported over the cable plant.

FIG. 3 is a block diagram 300 of test equipment that may be used to find a location of a source of CPD 324. The coaxial cable plant in this block diagram is one of many possible examples, but it exhibits a common equipment configuration illustrating amplifiers, a splitter, taps, terminators, and coaxial line. The block diagram 300 is meant as an example, and it is not intended to limit the scope of the invention. Testing may be performed at the headend or hub site, or out in the field. As illustrated in FIG. 3, testing is performed at a two-way amplifier housing 302. The two-way amplifier housing 302 connects to an input cable line 316, which connects to a hub or a headend through a fiber optic cable, and an output cable line 318, which connects to subscribers. The amplifier may be a device that is in a cascade of amplifiers, part of a fiber node, or located in the headend. A downstream signal 368, which may be 54-860 MHz, propagates from left to right on the diagram 300. An upstream signal 370, which may be 5-42 MHz, propagates from the right to the left on the diagram 300. Inside the amplifier housing 302, a subset of the components of a typical two-way amplifier is illustrated. The downstream signal 368 passes through a high (H) port of a diplex filter 304, a forward amplifier 308, a forward test point directional coupler 310, and a high port of a diplex filter 306. The upstream signal 370 passes through a low (L) port of the diplex filter 306, a return amplifier 312, an upstream test point directional coupler 314, and a low port of the diplex filter 304.

As an example, CPD may be formed when the downstream signal 368, which may be comprised of analog TV channels, digital TV channels, cable modem signal, or other signals, passes through the amplifier housing 302, the output cable line 318, a splitter 320, a tap 322 and reaches a source of CPD 324. In this example, the source of CPD 324 is a defective end of line terminator. The source of CPD 324 may, for example, have an internal diode formed by a bad ground connection. The internal corrosion-created diode mixes the downstream signal 368, creating the actual distortion signal 202 comprised of mixed products of the individual downstream carriers, which may be both analog and digital carriers. The actual distortion signal 202, which appears in the spectral plot of FIG. 2, propagates upstream, where it interferes with legitimate upstream signals.

Other network elements, including a two-way amplifier 326 and taps 328, 330, and 332, are without defect and do not create an upstream CPD distortion signal from the downstream signal components.

The downstream signal 368 is sampled through a coupled port of the forward test point directional coupler 310, through a band pass filter/tilt network 334 and through an amplifier 336, to create a filtered downstream signal 311. The filtered downstream signal 311 is connected to a local CPD source 338. The band pass filter/tilt network 334 preferably passes only the digital signals, which are more noise-like and random, and thus better suited for use as test signals than the analog television carriers. The analog television carriers have strong periodic horizontal sync energy. In the local CPD source 338, a non-linear element, such as a Schottky diode 344, mixes the filtered downstream signal 368 to make a local distortion signal 342. The local distortion signal 342 is correlated to the energy in the actual distortion signal 202 that is created by digital carriers in the source of CPD 324. A high port of a diplex filter 348 is connected to the amplifier 336. A common port of the diplex filter 348 is connected to the diode 344 through a bypass capacitor 343. An inductor 346 holds the diode 344 at 0 volts DC so a clipping point will be repeatable. A resistor 340 provides an improved match for the diplex filter 348. A low port of diplex filter 348 removes the distortion products above 42 MHz. An amplifier 350 boosts the level of the local distortion signal 342 before it is captured on a digital data acquisition unit 354.

A sample of the actual distortion signal 202 is captured from the coupled port of the upstream test point directional coupler 314 and is amplified by an amplifier 352. The digital data acquisition unit 354 simultaneously captures an amplified sample of the actual distortion signal 202 on channel 1 and the local distortion signal 342 on channel 2. Both traces are downloaded over a cable 356 to a personal computer (PC) 358 where they are processed together to find a time delay between the actual distortion signal 202 and the local distortion signal 342. The PC 358, running software, acts as a cross-correlator 372. The cable 356 may be a general-purpose interface bus (GPIB), serial, parallel, or universal serial bus (USB) depending on the interface method provided by the data acquisition unit 354. The round-trip time delay to and from the source of CPD 324 can be established as the time of an energy peak in a cross-correlation plot 360. The cross-correlation plot 360 on the PC shows a time difference 362 required for downstream energy to travel to the source of CPD 324 and to come back to amplifier housing 302. The distance to the source of CPD 324 can be calculated from the round-trip time for a signal to travel to the source of CPD 324 and return, taking into account the velocity of propagation of the cable. This distance calculation from time delay, which is also used in radar and time domain reflectometers, is well known in the art.

The band pass filter/tilt network 334 may be used for cross-correlation signal improvement. Digital traffic is better suited for cross-correlation measurements than analog signals, which are not as random. It is advantageous to include as many digital channels as are available. Since tilt of the downstream signal at the CPD source will not be known in advance, the tilt may optionally be adjusted to produce the strongest cross-correlation peak with the lowest uncorrelated noise. The gain of the amplifier 336 may also be adjustable to improve the quality of the cross-correlation signal. Likewise, it may be desirable to reverse the polarity of the diode 344, since a polarity of the CPD-creating junction diode is not known in advance. That is, either an anode or a cathode may be connected to ground.

The digital acquisition unit captures signals by performing an A-D (analog-to-digital) conversion and storing the signals in memory for subsequent downloading. Both signals may be considered to be arrays of numbers. The processing between the captured local distortion signal 342 and the captured actual distortion signal 202 can be done with a cross-correlation process, which is well known in the art. A software package called Matlab®, which is available from Math Works® can perform the cross-correlation function. "C Language Algorithms for Digital Signal Processing" by Embree and Kimble is a source for code that can perform the cross-correlation function. It is an advantage to cross-correlate two large arrays of samples, since it will produce the lowest background noise relative to a cross-correlation peak. The array size may vary from a few hundred to several thousand samples. A sampling rate of 100 Megasamples per second or greater is recommended for the digital acquisition unit 354, which may be a digital oscilloscope, a data acquisition card for a PC, or a module from suppliers such as Link Instruments, Pico, or National Instruments. Triggering of the digital acquisition unit 354 may be random or tied to an event such as video horizontal sync or the power line frequency.

This testing method has the advantage over prior art systems of using downstream signals, which are already on the downstream plant, as test signals. On many cable systems vacant bandwidth for testing simply does not exist.

Note that the cross-correlation in the time domain function can also be accomplished by signal processing in the frequency domain by a multiplication operation, as is well known in the art. Depending on the skill of the technician, it may be an advantage to write a computer program which performs the downloading of data from the data acquisition unit 354 and the cross-correlation automatically, as well as automatically making adjustments to the gain of the amplifier 336 and the tilt of the band pass filter/tilt network 334. Averaging can be used to reduce the effects of noise or interfering signals in the cross-correlation plot 360.

Note that the diode 344 will produce second, third, fourth and higher orders of distortion. Other devices, such as field effect transistors will produce large amounts of second order distortion. If two identical diodes are connected in parallel anode-to-cathode the even order distortion products can be cancelled. Thus, the local CPD source 338 may be modified to enhance a desired order of mixing.

To summarize, the local CPD source 338 is connected to the sample of the downstream signal 368, and used to create the local distortion signal 342. The local distortion signal 342 is stored on one channel of the digital acquisition unit 354. At the same time, a sample of the actual distortion signal 202 from the defective CPD-producing element is captured on another channel of the digital acquisition unit 354. The two traces are processed by a cross-correlator 372. The peak on the cross-correlation plot 360 shows the number of microseconds of delay between the actual distortion signal 202 and local distortion signal 342. The delay can be used to range the distance between the amplifier housing 302 and the source of CPD 324. Multiple sources of CPD can be identified by this test method.

The test can be performed at any point in the network, such as a hub site, a headend, or a node, a main branch (trunk line), a secondary branch (feeder line), a tap location, or even the side of a house, if the house is the source of CPD. Likewise, any defective component creating an actual distortion signal 202 can be ranged and identified by this method.

Since distortion creation problems do not typically occur in the middle of cable spans, the time delay can be used to find the most probable defective component. For example, a location 364 in the plant has the same time delay as the source of CPD 324, but is probably not a CPD source because it is in the middle of a cable span.

DESCRIPTION OF FIG. 3A

The embodiment of FIG. 3 utilizes the amplifier housing 302 that provides a sampling of both upstream and downstream signals. It is also possible to obtain the sampling of both upstream and downstream signals from any point on the coaxial line by using a high-impedance probe that touches the center conductor of the coaxial cable. This probe may, for example, be designed to touch the seizure screws that clamp the coaxial cable.

Figure 3A:
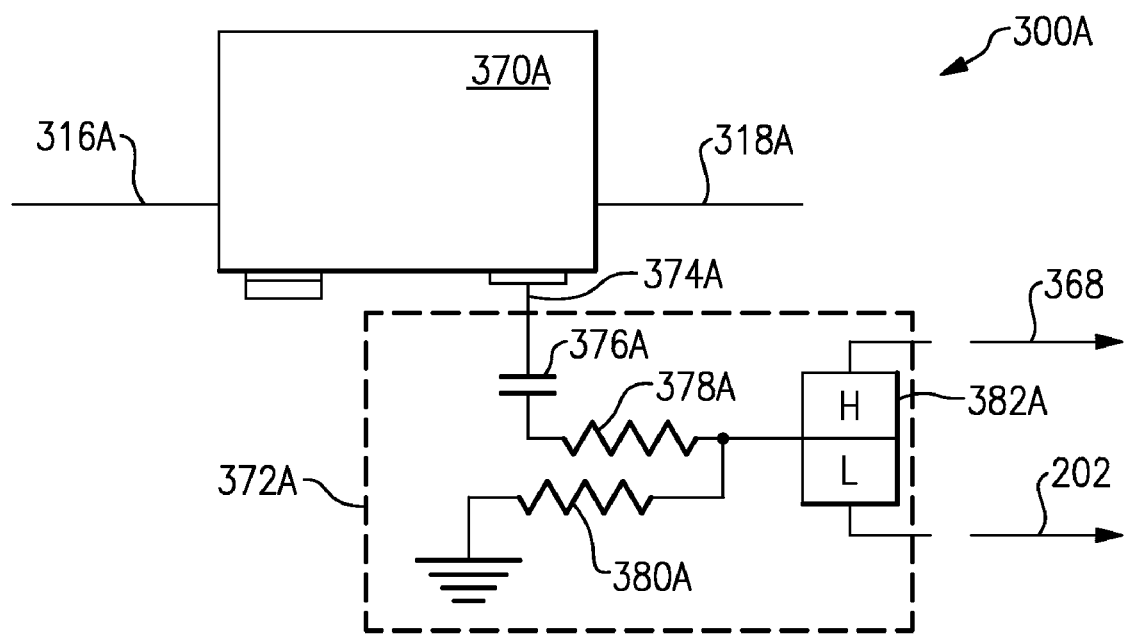
FIG. 3A is a block diagram that shows an alternate method to obtain upstream and downstream signals by probing a coaxial cable.

FIG. 3A is a block diagram 300A of a method to replace the amplifier housing 302 portion of FIG. 3. An equivalent input cable line 316A enters a housing 370A and an equivalent output cable line 318A exits the housing 370A. The housing may contain an amplifier, a tap, a directional coupler, a power inserter or other network elements. The housing 370A has a seizure screw port 374A with a plug cover that can be removed. A probe 372A can be inserted to obtain an equivalent sample of the downstream signal 368 and an equivalent sample of the actual distortion signal 202. A first lead of a blocking capacitor 376A is connected to the seizure screw and a second lead of the blocking capacitor 376A is connected to a first lead of a high-impedance resistor 378A. The second lead of the high-impedance resistor 378A, which may have a value of 2200 ohms, is connected to a first lead of an impedance-matching resistor 380A. The second lead of impedance matching resistor 380A, which may have a value of 82 ohms, is connected to ground. The junction of the second lead of the high-impedance resistor 378A and the first lead of an impedance-matching resistor 380A is connected to a common port of a diplex filter 382A. A high port of the diplex filter produces a sample of the downstream signal 368 and a low port of the diplex filter 382A produces a sample of the actual distortion signal 202. The high-impedance resistor 378A minimizes the impedance miss-match on the coaxial cable. The impedance-matching resistor 380A provides an impedance match for the diplex filter 382A. The blocking capacitor 376A prevents power-line AC voltage from destroying the resistors.

While being much simpler than the embodiment of FIG. 3, the embodiment of FIG. 3A has a disadvantage of not having directional couplers for sampling. Therefore, any echoes (reflections that are delayed signals) will produce false indications of CPD sources. However, the simplification and ease-of-use of the probe 372A are advantages.

DESCRIPTION OF FIG. 4

While some cable systems do not have any available vacant bandwidth for testing, other cable systems do. Another method to find the distance to a CPD source is to use a downstream frequency band and an equal bandwidth of upstream spectrum. The downstream frequency band should ideally be vacant to avoid interference with cable signals, but this method works even if the frequency band is occupied. This improved method uses an off-the-shelf network analyzer instead of custom-build hardware and software used by prior art methods.

Two signals can be put on the downstream signal path, one a fixed continuous wave ("CW") signal 436 and the other an up-converted swept signal 434. A mixing action of the fixed CW signal 436 with a swept signal 428 converts the swept signal 428 into the up-converted swept signal 434 in the downstream frequency band. The source of CPD mixes the up-converted swept signal 434 with the fixed CW signal 436 to create an upstream swept signal 432. The use of a conventional off-the-shelf network analyzer gives a complex frequency response associated with the returned upstream signal. The complex frequency response can be converted into the time domain via an inverse fast Fourier transform (IFFT). The IFFT option for the network analyzer is also called a "time domain option". The temporal plot of the IFFT shows a round-trip delay time to the source of the CPD. Some network analyzers, such as an Agilent® 8753 can be purchased with the optional IFFT function. For network analyzers that do not have an IFFT option, it is possible to import the complex frequency response data into a computer and perform the IFFT with PC software. "C Language Algorithms for Digital Signal Processing" by Embree and Kimble is also a source for code that can perform the IFFT transform.

Figure 4:
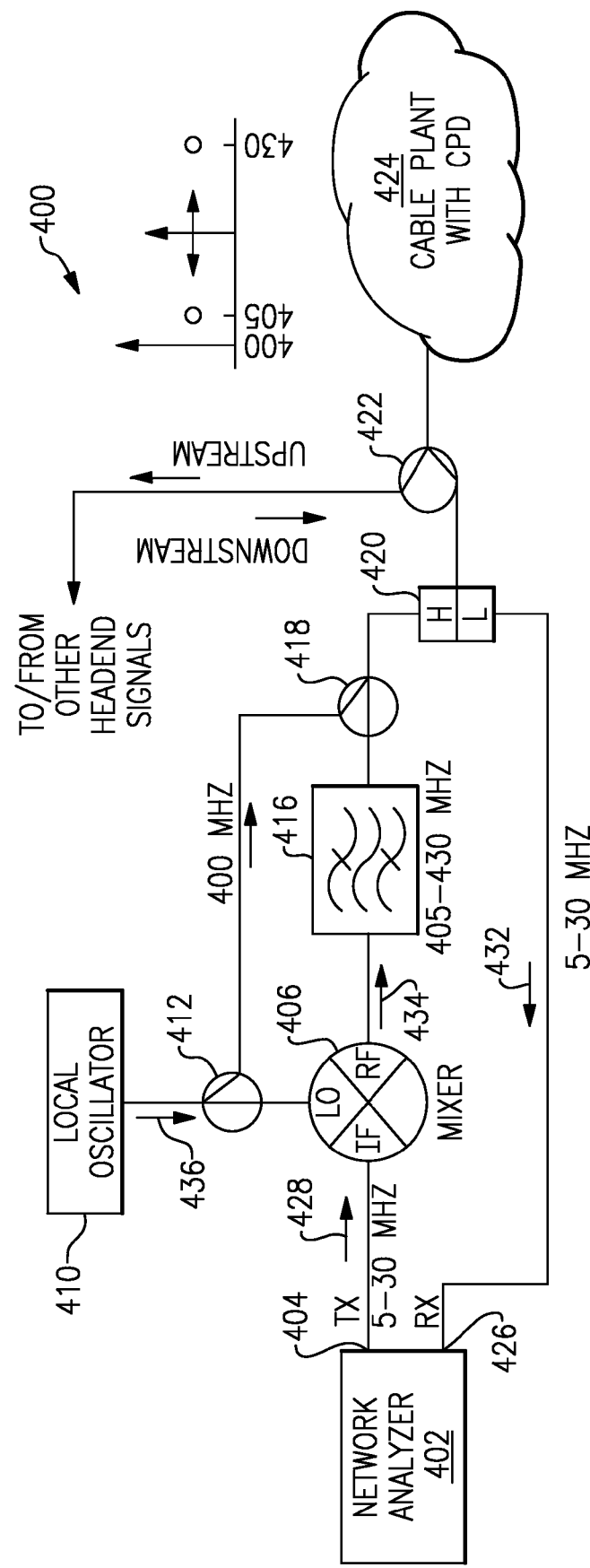
FIG. 4 is a test equipment block diagram of the present invention using empty spectrum on the cable plant and a conventional off-the-shelf network analyzer.

FIG. 4 is a block diagram 400 of a cable plant utilizing the up-converted swept signal 434. As an example, a network analyzer 402 is set to sweep between 5 and 30 MHz. It has been calibrated for transmission S-parameters over the 5 to 30 MHz frequency band. A RF (radio frequency) transmit output port 404 generates the swept signal 428. The RF transmit output port 404 is connected to an IF (intermediate frequency) port of a mixer 406 which may be a double balanced mixer. The mixer 406 is driven on a LO (local oscillator) port from a local oscillator 410 through a directional coupler 412. The local oscillator 410 can be running at a high frequency, such as 400 MHz. The swept signal 428 is up-converted from 5-30 MHz to 405-430 MHz by the mixer 406 creating the up-converted swept signal 434. The up-converted swept signal 434 leaves a RF port and enters a band pass filter 416, which passes signals between 405 and 430 MHz, and blocks undesired mixing products, such as an image. The delay of the band pass filter 416 is known beforehand, and the band pass filter's delay is relatively uniform over its pass band. A sample of the local oscillator's (410) signal is coupled through the coupled port of the directional coupler 412 into a coupled port of a combiner 418 and then into a high-side port of a diplex filter 420. A combiner 422 combines the up-converted swept signal 434 with the balance of the other downstream signals being transported over the cable network.

The downstream spectrum is ideally vacant between 400 and 430 MHz, except for the 400 MHz fixed CW signal 436 and the 405-430 MHz up-converted swept signal 434. A CPD-producing cable plant 424 has a source of CPD. At a CPD diode junction, the up-converted swept signal 434 is mixed with the local oscillator's (410) fixed CW signal 436, returning the up-converted swept signal 434 to the original 5-30 MHz frequency via a second order mixing action. The CPD-created upstream swept signal 432 travels upstream through a low port of the diplex filter 420 into a RF receive input port 426 of the network analyzer 402. A network analyzer, such as a HP8753C with an IFFT option, calculates an impulse response from the complex frequency response. The impulse response shows a round-trip time delay to and from the CPD-producing location.

The frequencies illustrated in this example illustrate second order mixing, producing a difference frequency signal. It is also possible to choose frequencies that produce a third or other order mixing. An additional CW signal can be inserted to cause third order mixing. Note that when there is large delay time, the sweep rate of the network analyzer must be slowed down to compensate for signal delay.

Also observe that if a larger test bandwidth is available, the distance to the CPD source can be ranged more accurately. Ranging time accuracy is proportional to the inverse of the swept bandwidth. If there are other desired or undesired signal sources in the 5-30 MHz band they will cause interference with the upstream swept signal 432, but the network analyzer can be adjusted to minimize the interference. Averaging on the network analyzer can be used to minimize the interference.

DESCRIPTION OF FIG. 5

The essential idea of the block diagram 400 of FIG. 4 can also be implemented in an alternate embodiment. In this alternate embodiment, a network analyzer 502 transmits 405-430 MHz, and a local oscillator 512 is used for an up-conversion on the receive leg instead of the transmit leg.

Figure 5:
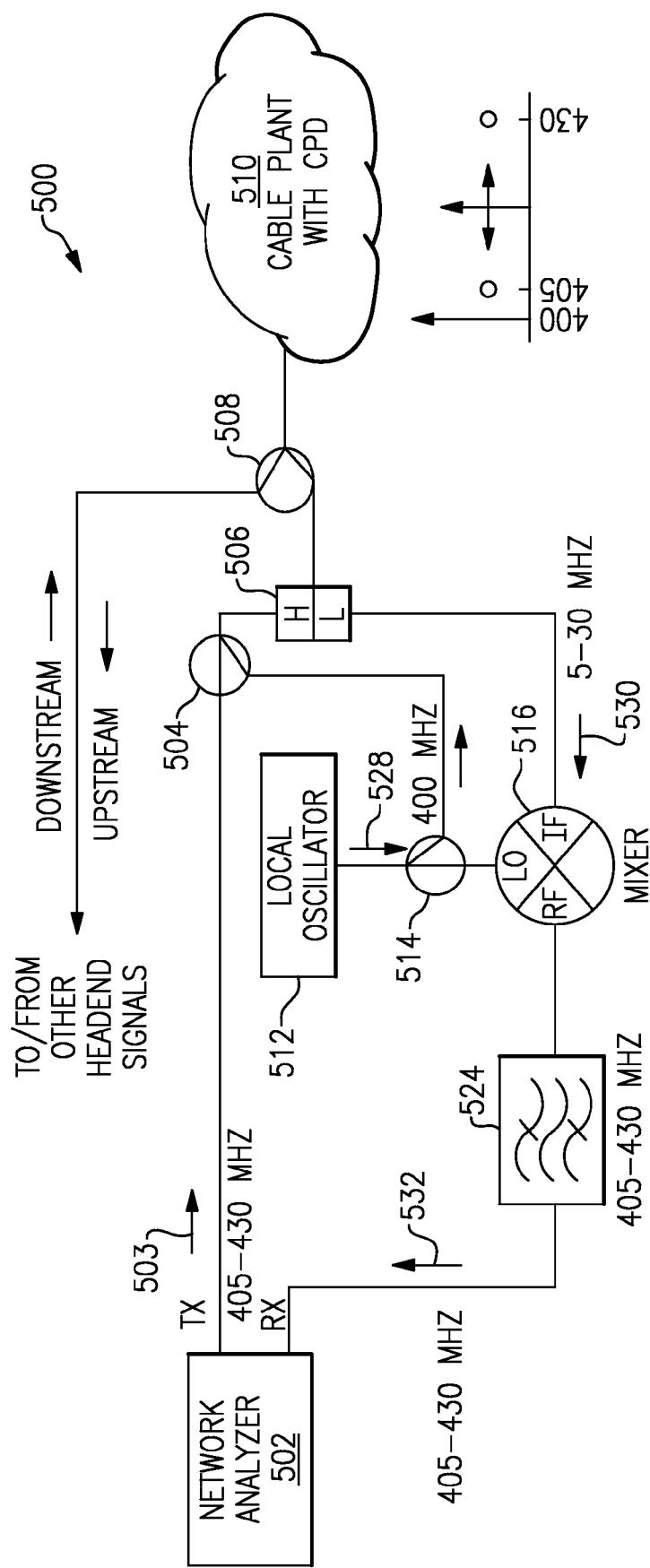
FIG. 5 is an alternate embodiment of the block diagram of FIG. 4.

FIG. 5 is a block diagram 500 showing the network analyzer 502 which may, for example, be sweeping 405-430 MHz. A swept signal 503 of the network analyzer 502 may be applied to a first input of a combiner 504. The local oscillator 512, which may be running at 400 MHz as an example, delivers a fixed CW signal 528 to an input of a directional coupler 514. A coupled output of the directional coupler 514 delivers the fixed CW signal 528 to a second input of the combiner 504. The output of the combiner 504, which now has both the swept signal 503 and a fixed CW signal 528 is applied to a high side of a diplex filter 506. A common port of the diplex filter 506 is applied to a first input of a combiner 508, which sums the swept signal 503 and fixed CW signal 528 with the other downstream cable signals. The downstream signal passes through an output of the combiner 508 into a CPD-producing cable plant 510. In the CPD-producing cable plant 510 a source of CPD mixes the swept signal 503 with the local oscillator's (512) fixed CW signal 528 to produce an upstream swept signal 530. The upstream swept signal 530 travels upstream into the diplex filter 506 and out of the diplex filter's (506) low port into an IF port of a mixer 516, where it is up-converted to 405-430 MHz by a mixing action with the local oscillator's (512) fixed CW signal 528 which has been applied to a LO port. The 405-430 485 MHz signal passes out of a RF port into a band pass filter 524. In the band pass filter 524, the CPD-created test signal is filtered to eliminate undesired mixing products and LO bleed-through. A 405-430 MHz up-converted signal 532 is connected from the output of the band pass filter 524 to a RF receive input of the network analyzer 502. Except for the frequency conversion that is taking place on the upstream signal path, the operation of the network analyzer, including the IFFT, is similar to the operation described in FIG. 4.

As mentioned above, because a cable network typically has a tree and branch construction, there may be multiple possible locations on the network that correspond to the calculated CPD distance. However, it is exceedingly unlikely that CPD will be created in the middle of a piece of cable. Therefore, the distances associated with connectors, actives, and passives will be considered primary suspect locations.

DESCRIPTION OF FIG. 6

If two CW carriers are inserted on a downstream cable plant, and they are mixed by second order mixing at a source of CPD, a resulting upstream CW signal will be created and propagate upstream. Delay can be determined from frequency response as a change in phase with respect to the change frequency. That is:

$$\text{delay} = \frac{d\phi}{d\omega} \cong \frac{\Delta\phi}{\Delta\omega} \quad (1)$$

where phi is the phase in radians and omega is the frequency in radians per second. Thus, one only needs to tune one of the two CW carriers and observe a phase change with respect to frequency to determine the distance to a source of CPD.

Figure 6:
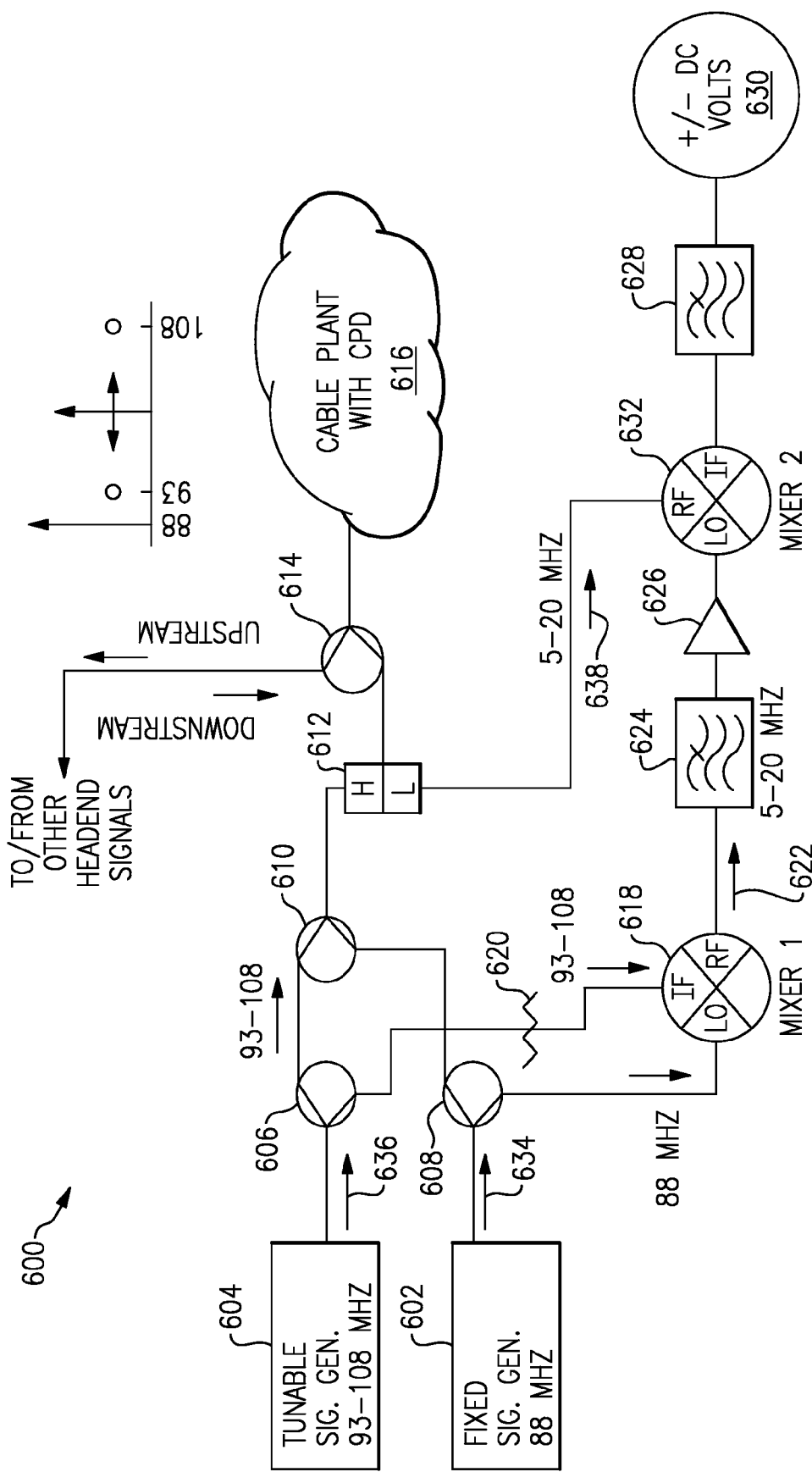
FIG. 6 is a test equipment block diagram of the present invention using a fixed and a tunable signal generator with an in-phase only demodulator.

FIG. 6 is a block diagram 600 of a method to range the distance to a source of CPD using a fixed signal generator 602 and a tunable signal generator 604. In a preferred embodiment the tunable signal generator has accurate frequency readout or an accompanying frequency counter. In this example, test signals are injected into the FM radio band, which is 88-108 MHz in the United States. The fixed signal generator 602 operates at 88 MHz and produces a fixed a CW signal 634. The tunable signal generator 604 is manually tuned between 93 and 108 MHz and produces a tunable CW signal 636. The output from the tunable signal generator 604 is connected to an input of a splitter 606. One output of the splitter 606 is connected to an input of a combiner 610. A fixed CW signal 634 of the fixed signal generator 602 is connected to an input of a splitter 608. An output of the splitter 608 is connected to another input of the combiner 610. An output of the combiner 610 now contains two CW signals, the fixed CW signal 634 and the tunable CW signal 636. The output of the combiner 610 is connected to a high port of a diplex filter 612. A common port of the diplex filter 612 is connected to an input port of a combiner 614. The other input port of the combiner 614 is connected to the headend source and sink of other signals. The output of the combiner 614 is connected to a cable plant with CPD 616. The CW carriers are mixed in the cable plant by a source of CPD to create an upstream CW signal 638, which travels upstream through the combiner 614 to the common port of the diplex filter 612. From the common port of diplex filter 612 the upstream CW signal passes through the diplex filter's (612) low port to the RF port of a second mixer 632.

The purpose of a first mixer 618 is to produce a mixing CW signal 622, which varies between 5 and 20 MHz. The frequency of the mixing CW signal 622 is the frequency difference between the tunable CW signal 636 and the fixed CW signal 634. A LO port of the first mixer 618 is connected to an output of the splitter 608 and an IF port of the first mixer 618 is connected to the splitter 606 through an attenuator 620. The attenuator 620 reduces the signal from the tunable signal generator 604 to approximately −10 dBm. The optimal LO level of the first mixer 618 and the second mixer 632 is assumed to be about +7 dBm. The mixing CW signal 622 passes through a low pass filter 624, which removes undesired mixing products and LO bleed-through. The output of the low pass filter 624 is connected to an amplifier 626 which boosts the LO drive level to the second mixer 632 to about +7 dBmv. The IF output of the second mixer 632 connects to a low pass filter 628, which may have a low corner frequency such as 10 kHz. The output of the low pass filter 628 is connected to a DC voltage display unit 630. The low pass filter passes the DC voltage while eliminating most noise.

Assuming that CPD is present, the output of the second mixer 632 will be a voltage that is a steady DC level while the tunable signal generator 604 is not being tuned, and will produce a sine wave voltage, centered about zero volts while the tunable signal generator 604 is being tuned. The output voltage can be displayed on a DC voltmeter, which deflects positive and negative relative to zero volts. Likewise, the voltage can be displayed on an oscilloscope, bar-graph or any other voltage indicating instrument.

The round-trip delay time associated with the round-trip distance to a source of CPD is determined by tuning the tunable signal generator 604 to find the frequency difference between positive-going voltage nulls, or two adjacent voltage peaks, on the DC voltage display unit 630. The reciprocal of the frequency is the unknown delay. For example, if the frequency difference between nulls is 100 kHz, the round-trip delay is 10 microseconds. For increased frequency accuracy, an operator may increase the number of positive-going voltage nulls and divide the frequency by the number of nulls used.

This method has an advantage of being conceptually simple and easy to operate, but if there are multiple large sources of CPD, the voltage deflection will not be a simple sinusoid, but move through a complicated periodic pattern, making distance ranging difficult.

DESCRIPTION OF FIG. 7

Figure 7:
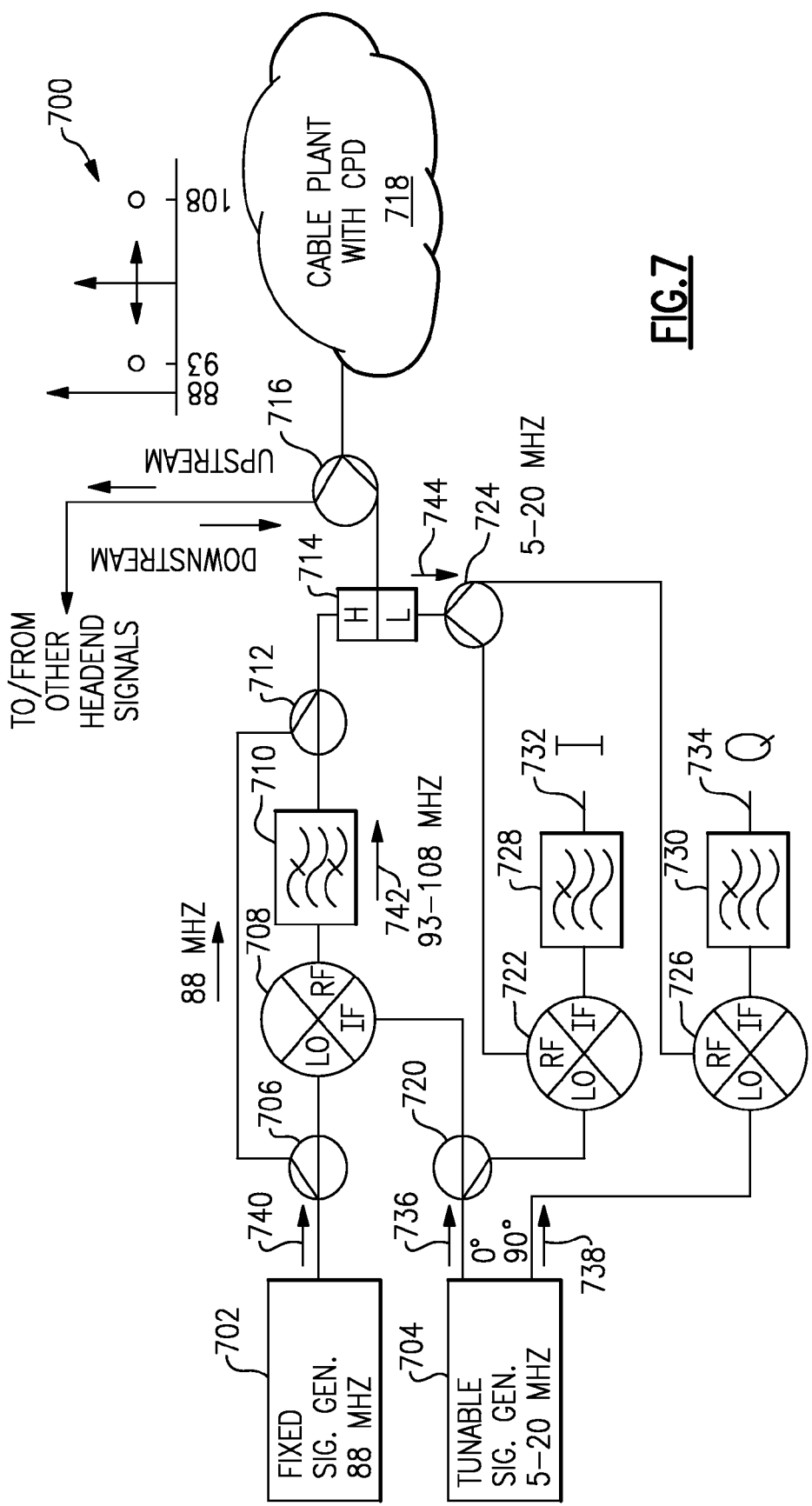
FIG. 7 is a test equipment block diagram of the present invention using a fixed and a tunable signal generator with a complex demodulator.

FIG. 7 is a block diagram 700 of an improved method to locate multiple sources of CPD. A fixed signal generator 702, running at 88 MHz, supplies a fixed CW signal 740 to a directional coupler 706. The output of the directional coupler 706 is connected to a LO port of an up-converting mixer 708. The RF port of the up-converting mixer 708 is connected to a band pass filter 710. The band pass filter 710 passes signals between 93 and 108 MHz with a flat frequency response and a uniform delay. The output of the band pass filter 710 is connected to one leg of a combiner 712. The other leg of the combiner 712 is connected to a coupled leg of the coupler 706. The output of the combiner 712, which contains a fixed CW signal at 88 MHz and an up-converted tunable signal 742 between 93 and 108 MHz, is connected to a high port of a diplex filter 714. A common port of the diplex filter 714 is connected to an input of a combiner 716. The other input of the combiner 716 is connected to the sink and source of other headend signals. The output of the combiner 716 is connected to a cable plant with CPD 718. Using second order mixing, the source of CPD mixes the fixed CW signal 740 and the up-converted tunable signal 742 and returns a mixed upstream signal 744 in the return band between 5 and 20 MHz. The mixed upstream signal 744 passes through the combiner 716 and the common port of the diplex filter 714 to the low port of the diplex filter 714. The low port of the diplex filter 714 is connected to a splitter 724.

A tunable signal generator 704 produces a tunable sine wave signal 736, on a port labeled 0 deg, and a tunable cosine wave signal 738, on a port labeled 90 deg. Numerically controlled oscillators (NCOs) are one possible way to produce tunable CW outputs with both sine and cosine waves. Hilbert transformers are another way. A directional coupler 720 splits the tunable sine wave signal 736. One leg of the directional coupler 720 is connected to an IF port of the up-converting mixer 708. The other leg of the directional coupler 720 is connected to a LO port of an in-phase mixer 722. The RF port of the in-phase mixer 722 is connected to one output of the splitter 724. The other output of the splitter 724 is connected to the RF port of a quadrature mixer 726. The tunable cosine wave signal 738, is connected to a LO port of the quadrature mixer 726. An in-phase low pass filter 728 is connected between the IF output of the in-phase mixer 722 and an I (in-phase) output line 732. An IF output of the quadrature mixer 726 is connected to an input of a quadrature low pass filter 730. The output of the quadrature low pass filter 730 is connected to a Q (quadrature) output line 734. The low pass filters 728 and 730 may have a low bandwidth for good noise rejection, provided that the frequency of the tunable signal generator 704 is changed slowly. For example, the bandwidth could be between 1 kHz and 10 kHz.

The I and Q output lines can be used in several ways. If an oscilloscope is put into an X-Y mode and the I output line 732 is connected to the X-channel and the Q output line 734 is connected to the Y-channel, and there is one source of CPD present, as the frequency of the tunable signal generator 704 is changed, the trace on the oscilloscope will trace out a circle. This is an example of a Lissajous pattern. A reciprocal of the frequency change required to make a complete circle is the round-trip delay associated with the CPD source.

Alternately, if the frequency of the tunable signal generator 704 is changed in small and uniform steps, and the I output line 732 voltages and the Q output line 734 voltages are recorded by an analog-to-digital converter at each step, the complex frequency response associated with the source of CPD is obtained. The complex frequency response can be supplied to an IFFT process that will return the impulse response. The impulse response will show the time delay associated with each of multiple CPD sources. A personal computer (PC) can control a programmable voltmeter that measures the I and Q voltages and change the frequency of the tunable signal generator 704. Equipment control is commonly done using GPIB. Another approach is to use an embedded microprocessor in place of the PC. Essentially, you have assembled a poor-man's network analyzer with the equipment in diagram FIG. 7.

A simplification is to remove the quadrature channel components: the quadrature mixer 726, the quadrature low pass filter 730, the splitter 724, and the cosine port on the tunable signal generator 704. This can be done by switching the tunable sine wave output 736 of the tunable signal generator 704 between a sine and cosine wave, and taking two voltage measurements on the I output line 732 for each frequency step. A NCO, such as the Analog Devices AD9850BRS has an ability to accurately change phase by 90 degrees on command.

Another Sweep System

Another sweep system that can be used in place of the network analyzer is the Cable Scope® system sold by Holtzman Inc. This device uses a burst test signal to produce the complex frequency response and impulse response. The round-trip time delay to a CPD source can be measured on the impulse response. In particular, the Cable Scope can be used in a local test configuration with the HE2M reference signal transmitter replacing the RF transmit output port 404 on the network analyzer 402 and a TDS-1002 digital oscilloscope replacing the RF receive input port 426 on the network analyzer 402.

Summary Ramifications and Scope

Although the description above contains many specificities, these should not be construed as limiting the scope of the invention, but as merely providing illustrations of some of the presently preferred embodiments of the invention. For example, 1. One may use another circuit to produce second order mixing in the local CPD source 338. For example, field effect transistors (FETs) have a square-law characteristic that can be exploited to produce good second order mixing.

2. The downstream digital carrier(s) that are selected to be test signals may be multiple 6 MHz wide carriers. For example, if second order mixing is used, a carrier can mix with another carrier that is 12 MHz away and create noise in the return band at 12 MHz. In general, as the number of carriers is increased, the background noise in the correlation plot decreases and the correlation peak increases.

3. If a cable system, such as a private or hospital system, has not yet deployed digital carriers, one or more digital carriers can be inserted for CPD location.

4. A band-limited random noise source may also be inserted and used as a test signal for CPD location.

5. The system of the present invention may be used for other applications such as satellite, microwave, or telephony.

6. Averaging may be used to increase the accuracy of all measurements. Averaging is particularly useful in the presence of additive return noise.

While the preferred embodiments of the invention have been particularly described in the specification and illustrated in the drawing, it should be understood that the invention is not so limited. Many modifications, equivalents and adaptations of the invention will become apparent to those skilled in the art without departing from the spirit and scope of the invention, as defined in the appended claims.

What I claim is:

1. A method of ranging a distance to a source of common path distortion in a two-way cable system that has a downstream signal path and an upstream signal path, said method comprising the steps of:
   (a) generating a fixed frequency signal for transmission in the downstream signal path of the cable system;
   (b) generating a first swept frequency signal, having a first swept bandwidth, for transmission in the downstream signal path of the cable system;
   (c) transmitting the fixed frequency signal and the first swept frequency signal in the downstream signal path of the cable system;
   (d) receiving a second swept frequency signal from the upstream signal path of the cable system, the second swept frequency signal having a second swept bandwidth and being created by the source of common path distortion by a mixing action of the fixed frequency signal with the first swept frequency signal, the second swept bandwidth of the second swept frequency signal being approximately equal to the first swept bandwidth of the first swept frequency signal;
   (e) determining a complex frequency response associated with the second swept frequency signal;
   (f) determining an impulse response from the complex frequency response and obtaining a time delay from the impulse response, the time delay being associated with the source of common path distortion; and
   (g) determining the distance to the source of common path distortion from the time delay.

2. A method according to claim 1, wherein step (b) further includes—
   (i) generating an intermediate swept frequency signal having a swept bandwidth, and
   (ii) up-converting the intermediate swept frequency signal to form the first swept frequency signal.

3. A method according to claim 2, wherein step (i) includes generating the intermediate swept frequency signal using a network analyzer.

4. A method according to claim 3, wherein step (d) includes receiving the second swept frequency signal in the network analyzer.

5. A method according to claim 2, wherein the swept bandwidth of the intermediate swept frequency signal is approximately equal to the first swept bandwidth of the first swept frequency signal.

6. A method according to claim 2, wherein the intermediate swept frequency signal sweeps in frequency from a first intermediate frequency to a second intermediate frequency, and wherein the second swept frequency signal sweeps in frequency from a first upstream frequency to a second upstream frequency, the first intermediate frequency being approximately equal to the first upstream frequency and the second intermediate frequency being approximately equal to the second upstream frequency.

7. A method according to claim 1, wherein step (b) includes generating the first swept frequency signal using a network analyzer.

8. A method according to claim 7, wherein step (e) includes determining the complex frequency response using the network analyzer.

9. A method according to claim 8, wherein step (f) includes determining the impulse response using the network analyzer.

10. A method according to claim 1, wherein the first swept frequency signal is generated in step (b) solely by a network analyzer.

11. A method according to claim 10, wherein the first swept frequency signal sweeps in frequency from a first downstream frequency to a second downstream frequency, and wherein the second swept frequency signal sweeps in frequency from a first upstream frequency to a second upstream frequency, and
   wherein step (d) further includes up-converting the second swept frequency signal such that the first and second upstream frequencies of the second swept frequency signal are converted to approximately the first and second downstream frequencies of the first swept frequency signal, respectively.

12. A method according to claim 1, wherein step (a) includes generating a fixed frequency continuous wave signal.

13. A method according to claim 1, wherein the first swept bandwidth of the first swept frequency signal is at least 25 MHz, and wherein the second swept bandwidth of the second swept frequency signal is at least 25 MHz.

14. A method of ranging a distance to a source of common path distortion in a two-way cable system that has a downstream signal path and an upstream signal path, said method comprising the steps of:
   (a) generating a first downstream signal having a fixed frequency, for transmission in the downstream signal path of the cable system;
   (b) generating a second downstream signal having a tunable frequency varying between first and second downstream frequencies, for transmission in the downstream signal path of the cable system;
   (c) transmitting the first and the second downstream signals in the downstream signal path of the cable system;
   (d) receiving an upstream signal from the upstream signal path of the cable system, the upstream signal being created by the source of common path distortion by a mixing action of the first downstream signal with the second downstream signal, the upstream signal varying in frequency between first and second upstream frequencies in accordance with a variation in frequency between first and second downstream frequencies, respectively, of the second downstream signal;
   (e) generating in-phase and quadrature mixing signals, each varying in frequency between the first and the second upstream frequencies in accordance with the variation in frequency between the first and the second downstream frequencies, respectively, of the second downstream signal, the quadrature mixing signal being shifted in phase relative to the in-phase mixing signal by about 90 degrees;
   (f) mixing the upstream signal with the in-phase mixing signal to produce an in-phase voltage level, and mixing the upstream signal with the quadrature mixing signal to produce a quadrature voltage level, the in-phase voltage level and the quadrature voltage level varying in accordance with the variation in frequency of the second downstream signal;

(g) tuning the second downstream signal between the first and the second downstream frequencies to produce a plurality of in-phase voltage levels and a plurality of quadrature voltage levels;

(h) determining a time delay associated with the source of common path distortion from the plurality of in-phase voltage levels and the plurality of quadrature voltage levels; and (i) determining the distance to the source of common path distortion from the time delay.

15. A method according to claim 14, wherein step (g) includes producing a generally circular voltage pattern with the plurality of in-phase voltage levels and the plurality of quadrature voltage levels, and wherein step (h) includes determining the time delay from the reciprocal of the frequency change required to trace out the generally circular voltage pattern.

16. A method according to claim 14, further comprising the step of determining a complex frequency response from the plurality of in-phase voltage levels and the plurality of quadrature voltage levels, and wherein step (h) includes determining an impulse response from the complex frequency response and obtaining the time delay from the impulse response.

17. A method of ranging a distance to a source of common path distortion in a two-way cable system that has a downstream signal path and an upstream signal path, said method comprising the steps of:

(a) generating a first downstream signal having a fixed frequency, for transmission in the downstream signal path of the cable system;

(b) generating a second downstream signal having a tunable frequency varying between first and second downstream frequencies, for transmission in the downstream signal path of the cable system;

(c) transmitting the first and the second downstream signals in the downstream signal path of the cable system;

(d) receiving an upstream signal from the upstream signal path of the cable system, the upstream signal being created by the source of common path distortion by a mixing action of the first downstream signal with the second downstream signal, the upstream signal varying in frequency between first and second upstream frequencies in accordance with a variation in frequency between first and second downstream frequencies, respectively, of the second downstream signal;

(e) generating a mixing signal varying in frequency between the first and the second upstream frequencies in accordance with the variation in frequency between the first and the second downstream frequencies, respectively, of the second downstream signal;

(f) mixing the upstream signal with the mixing signal to produce a voltage level that varies generally sinusoidally in accordance with the variation in frequency of the second downstream signal;

(g) tuning the second downstream signal between the first and the second downstream frequencies, to produce a generally sinusoidal voltage pattern in accordance with step (f);

(h) determining a time delay associated with the source of common path distortion from the generally sinusoidal voltage pattern; and (i) determining the distance to the source of common path distortion from the time delay.

18. A method according to claim 17, wherein the frequency range of the downstream signal path of the cable system includes the FM radio band,
and wherein step (a) includes generating the first downstream signal with a fixed frequency within the FM radio band,
and wherein step (b) includes generating the second downstream signal having a tunable frequency range within the FM radio band.

* * * * *